Aug. 6, 1935. R. C. HILL 2,010,082
SAW PACKAGE
Filed April 26, 1934

Inventor,
Roland C. Hill,
by Roberts, Cushman & Woodberry
Attys.

Patented Aug. 6, 1935

2,010,082

UNITED STATES PATENT OFFICE 2,010,082

SAW PACKAGE

Roland C. Hill, Leominster, Mass., assignor to Simonds Saw and Steel Company, Fitchburg, Mass., a corporation of Massachusetts Application April 26, 1934, Serial No. 722,421

7 Claims. (Cl. 206—46)

Objects of the present invention are to provide means for packaging circular saws which is light and inexpensive in construction, which is easy to assemble and disassemble, which is able to withstand rough handling by truckmen notwithstanding the destructive action of the saw due to its sharp peripheral teeth and heavy weight, and which has neither projections nor hard exposed surfaces likely to injure those handling the package.

According to this invention these objects are accomplished by a package comprising disks on opposite sides of the saw with means around the periphery of the saw having sufficient softness to be indented by the saw teeth without dulling the teeth and being thick enough not to be punctured by the teeth during rough handling, together with means overlapping the peripheries of the disks for holding the parts in position. The holding means preferably comprises a ribbon binder extending around the periphery of the package with its margins cemented to the disks respectively. By creping the ribbon transversely and stretching its central zone longitudinally during application, this central zone is smoothed out, thereby facilitating the application of the creped margins to the outer sides of the respective disks and at the same time presenting a comparatively smooth surface around the periphery of the finished package. By virtue of this smooth surface the binder is less likely to tear when the package is dragged along or rolled or turned on edge.

An optional feature of the invention consists in making the tooth projecting means in the form of integral inturned flanges around the peripheries of the disks, whereby the flanges not only protect the saw teeth but they also serve to relieve the binding ribbon from the stresses and strains resulting from any tendency for the saw to slide out from between the disks, as for example in case the package be thrown on the floor, flatwise but obliquely to the floor. If it were not for the flanges integral with the disks this tendency would of course have to be counteracted by the binding ribbon, which would preclude the use of such a binder because of the weakness of any ribbon adapted to be applied as herein described.

For the purpose of illustration a typical embodiment of the invention is shown in the accompanying drawing in which.

Figure 1:
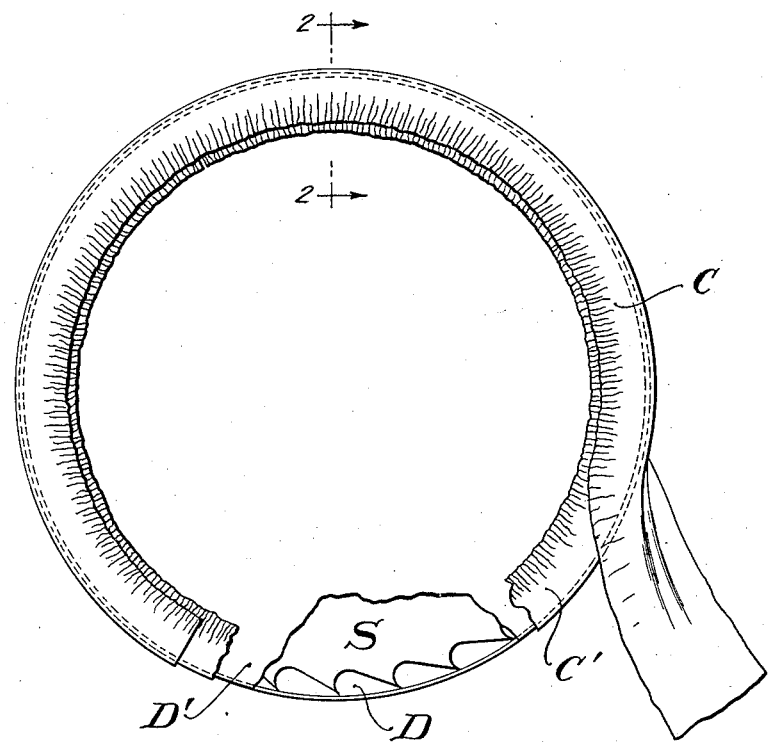
Fig. 1 is a side elevation of the package with parts broken away.
Figure 2:
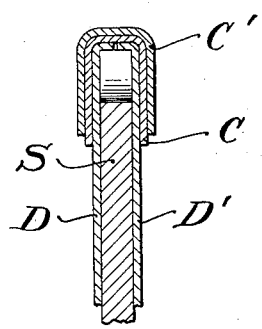
Fig. 2 is a section on line 2—2 of Fig. 2.

The particular embodiment of the invention chosen for the purpose of illustration comprises two disks D and D' on opposite sides of the saw S, the disks being somewhat larger in diameter than the maximum diameter of the saw and having their peripheral margins turned inwardly at right angles to overlap the saw teeth and substantially to meet at their edges intermediate the two faces of the saw. The two disks are secured in position by two ribbons of paper C and C' applied over each other, the paper being creped transversely and, as it is applied to the package, being stretched longitudinally along its central zone. The paper is secured to the package by means of cement which may be applied either in liquid form during the application of the ribbon or in gummed form previous to its application. When applied in gummed form it may be either of the hard gum type, which requires wetting or heating, or of the plastic type which adheres in response to pressure without wetting or heating. When applying the ribbon by a cementing process which involves wetting or otherwise weakening the paper at the time of application the cemented areas are preferably confined to the margins of the ribbons which lie along the sides of the package so that the central longitudinal zone of the ribbons are not wet or otherwise weakened at the time of application.

By stretching the transversely creped binding strips along their central zones as they are applied to the disks, several important advantages are attained. The stretching action facilitates the folding of the margins of the ribbons along the sides of the package; it results in a relatively smooth surface around the peripheral edge of the package, so that the periphery of the package has less tendency to tear when rubbed or struck against a rough surface; the folded margins of the ribbons lie flatter and adhere tighter because they have little if any greater tendency to bunch together than if the ribbons were applied to a straight edge (without central stretching) instead of a curved edge; and therefore the paper may be made of heavier stock and may be applied in multiple layers without danger of either layer accidentally peeling off.

It should be understood that the present disclosure is for the purpose of illustration only and that this invention includes all modifications and equivalents which fall within the scope of the appended claims. For example, by using binding ribbons creped and applied as aforesaid the inturned flanges on the disks may be omitted, particularly on saws of the smaller sizes.

I claim:

1. A circular saw package comprising disks on opposite sides of the saw, sheet material covering the peripheral saw teeth with the saw in a plane perpendicular to the sheet material, said sheet material being soft enough to be indented by the saw teeth without dulling the teeth and thick enough not to be punctured by the teeth, and sheet material adhesively mounted over the peripheries of the disks for holding the parts in position.

2. A circular saw package comprising a container in the form of disks on opposite sides of the saw, the container having integral means of sheet material covering the peripheral saw teeth and substantially bridging the space between the two disks with the saw in a plane perpendicular to the sheet material, and sheet material adhesively mounted over the peripheries of the two disks for holding the disks in position on opposite sides of the saw respectively.

3. A circular saw package comprising a container in the form of disks on opposite sides of the saw, the disks having integral inturned flanges covering the peripheral saw teeth and substantially meeting intermediate the two disks, said flanges being turned inwardly approximately at right angles so as to extend transversely of the discs and a ribbon binder extending around the periphery of the container with its margins cemented to the disks respectively.

4. A circular saw package comprising a container in the form of disks on opposite sides of the saw, the disks having inturned flanges covering the peripheral saw teeth and substantially meeting intermediate the two disks, and a transversely creped ribbon of paper extending around the periphery of the container with its margins bent over the respective disks and cemented thereto, the longitudinal central portion of the ribbon being stretched longitudinally to flatten out the creping thereof.

5. A circular saw package comprising cardboard disks on opposite sides of the saw with integral inturned flanges overlapping the saw teeth, said flanges being turned inwardly approximately at right angles so as to extend transversely of the discs and sheet material adhesively mounted over the peripheries of the disks for holding the disks in position.

6. A circular saw package comprising cardboard disks on opposite sides of the saw with integral inturned flanges overlapping the saw teeth, and a transversely creped ribbon of paper extending around the periphery of the container with its margins bent over the respective disks and cemented thereto, the longitudinal central portion of the ribbon being stretched longitudinally to flatten out the creping thereof.

7. A circular saw package comprising disks on opposite sides of the saw and a binding ribbon extending around the periphery of the disks with its margins folded over the outer sides of the disks and cemented thereto, the ribbon being creped transversely and stretched longitudinally along its central zone so that the peripheral edge of the package is relatively smooth and the edges of the creped ribbon are substantially unstretched.

ROLAND C. HILL.